United States Patent [19]

Nield et al.

[11] Patent Number: 4,762,697
[45] Date of Patent: Aug. 9, 1988

[54] REMOVAL OF PHOSPHORUS FROM MUD

[75] Inventors: Michael A. Nield, Placentia, Canada; Basil N. Robbins, Birmingham, England

[73] Assignee: Tenneco Canada Inc., Islington, Canada

[21] Appl. No.: 859,440

[22] Filed: May 5, 1986

[51] Int. Cl.⁴ .............................................. C01B 25/01
[52] U.S. Cl. .................................. 423/304; 423/323
[58] Field of Search ............................... 423/304, 323

[56] References Cited

U.S. PATENT DOCUMENTS 2,925,326  2/1960  Pieper et al. ...................... 423/317
4,649,035  3/1987  Barber ..................................... 71/33

FOREIGN PATENT DOCUMENTS 791589  1/1981  U.S.S.R. ........................... 423/321 R

Primary Examiner—John Doll
Assistant Examiner—Wayne A. Langel
Attorney, Agent, or Firm—Sim & McBurney

[57] ABSTRACT

Phosphorus mud and other phosphorus-containing waste materials are processed to remove water and phosphorus and to leave a solid mass which is safe for disposal. The phosphorus mud is heated to boil off the water and then to boil off yellow phosphorus, which is subsequently condensed. The residual phosphorus then is removed mainly by burning off in air along with some volatilization, so as to increase the recovery rate of solids from the waste material, when compared to removal of residual phosphorus by volatilization under nitrogen. A significant improvement in processing rate is achieved at the expense of a loss of a minor amount of recoverable phosphorus.

7 Claims, 1 Drawing Sheet

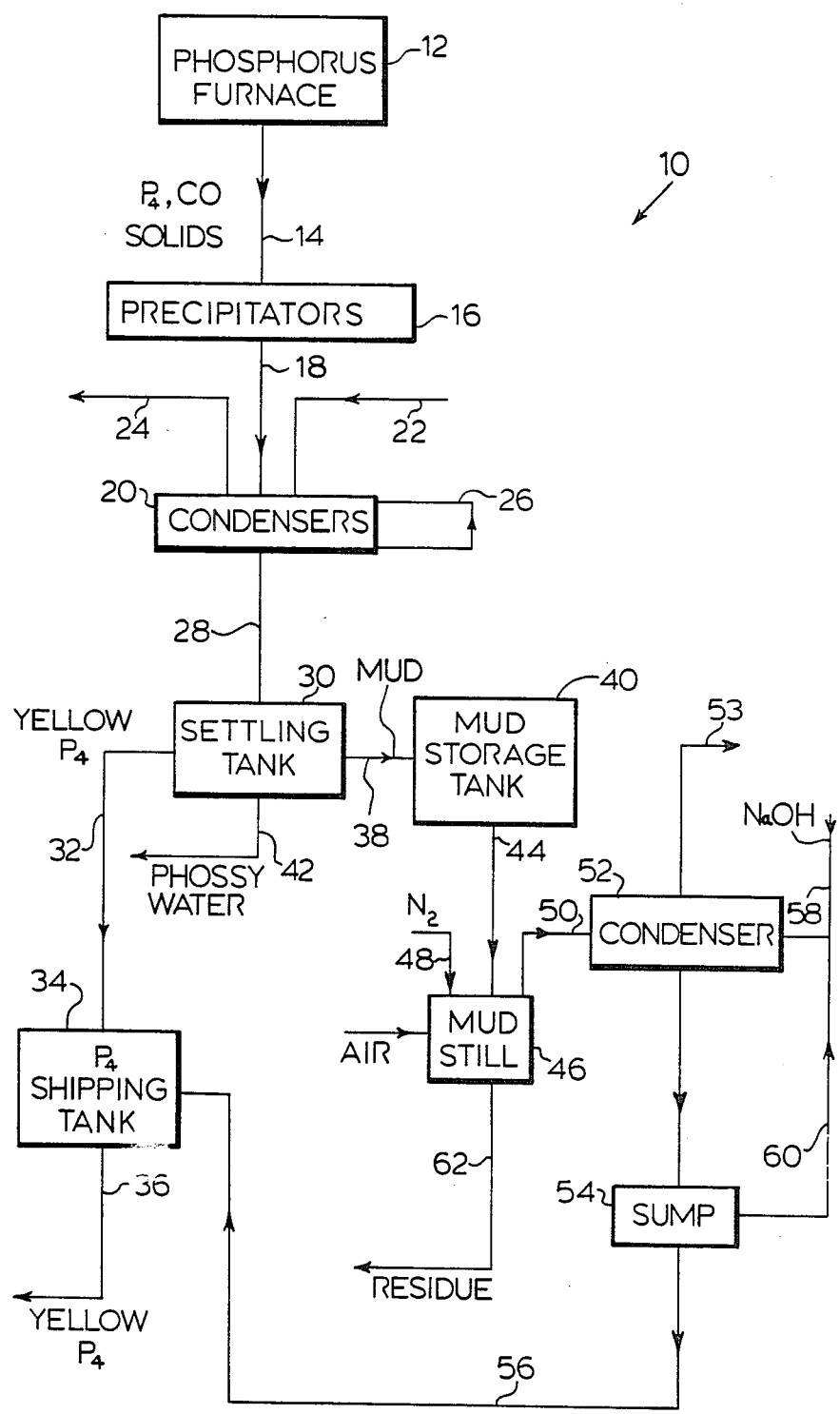

REMOVAL OF PHOSPHORUS FROM MUD

FIELD OF INVENTION

The present invention relates to the processing of phosphorus-containing waste material, preferably in the form of phosphorus mud, to remove phosphorus therefrom.

BACKGROUND TO THE INVENTION

The electrothermal method for the production of phosphorus involves the reduction of phosphate rock with coke or other carbonaceous reducing agent in the presence of silica in an electric furnace. The produced phosphorus vaporizes and is removed from the furnace as a gaseous products stream, which usually also contains carbon monoxide and appreciable quantities of entrained dust.

The product gas stream often is passed through an electrostatic precipitator to remove the dust, prior to cooling to condense the phosphorus, which is collected under water. The carbon monoxide may be recovered for use as fuel or more usually is flared to atmosphere.

The phosphorus condenser drains into a sump wherein the phosphorus product is collected. Settling of the product may be allowed to occur in the sump or more usually the product is discharged from the sump to a settling and storage tank. Upon settling of the phosphorus-containing product, either in the sump or in a separate vessel, three separate layers generally form.

A layer of relatively high grade phosphorus is obtained at the bottom of the settling vessel. The intermediate layer is a mixture of material, commonly termed "phosphorus mud" or simply "mud" by the applicants, and these terms are used herein to refer to such material. Phosphorus mud consists generally of phosphorus droplets or globules, solid impurities and water, and usually contains about 25 to about 60 wt. % phosphorus. Above the mud layer is a water layer, commonly termed "phossy water" by the applicants. Phossy water consists largely of water but contains some phosphorus and suspended solids. The boundary between the phossy water layer and the mud layer often is not clearly defined.

The bottom phosphorus layer usually is removed from the storage and settling tank to a phosphorus storage tank from where the phosphorus is shipped to customers. The phosphorus mud layer may be pumped to another settling tank where some additional separation of phossy water occurs, this phossy water overflowing back to the primary settling tank. Periodically, typically once-a-day, the phosphorus mud is pumped to large storage tanks where the mud typically has a residence time of several months, enabling further separation of the mud into a lower somewhat impure phosphorus layer ("black" phosphorus), an intermediate mud layer and an upper phossy water layer. The black phosphorus layer can be recirculated to the primary storage and settling tank while the resulting mud is generally an intractable phosphorus-containing emulsion.

Various methods for removing and recovering elemental phosphorus from phosphorus mud have been suggested in the prior art. For example, the applicants distill the mud in an inert atmosphere, usually nitrogen, in the equipment illustrated in U.S. Pat. No. 4,081,333 at high temperature, collect the distilled phosphorus and then dispose of the residual solids as landfill. The disclosure of U.S. Pat. No. 4,081,333 is incorporated herein by reference.

In using the equipment described in the aforesaid U.S. Pat. No. 4,081,333 to remove phosphorus from phosphorus mud to enable the solids to be disposed of safely, the processing takes place in three stages, namely an initial water boil period when the moisture associated with the mud is boiled off, a phosphorus boil period during which yellow (white) phosphorus is boiled off from the solid residue and a tail period in which the solid residue is freed from residual amorphous red phosphorus. The tail period continues until the level of phosphorus in the residue has been decreased to that at which the residue offers no fire hazard or health hazard due to elemental phosphorus.

The quantity of red phosphorus required to be removed is small compared with the yellow phosphorus, estimated typically to be about 10% of the total amount of recoverable phosphorus in the mud, and yet that tail period can form from about 40 to about 70% of the total still batch time. The yellow phosphorus boils at 280° C. at atmospheric pressure and the amorphous phosphorus sublimes at about 400° to 450° C. at atmospheric pressure. Temperatures in the residue reach about 550° C. towards the end of the batch and hence a considerable energy input is required.

The mud processing operation is a batch one and the longer the period of time of the cycle then the lesser is the overall throughput of the still on a long term basis. It is necessary to eliminate the red amorphous phosphorus in order to provide residual solids which are safe for disposal. But the elimination of the relatively small amount of red phosphorus occupies an inordinately large proportion of the cycle time.

SUMMARY OF INVENTION

In accordance with the present invention, the batch time necessary to process the phosphorus mud to a safely disposable form is decreased by effecting the tail period of the mud processing at least partially in the presence of a molecular oxygen-containing gas, generally air, in place of nitrogen.

By effecting tail period in the presence of air, the small quantity of residual phosphorus is burned to form $P_2O_5$ and is removed from the solid residue mainly in this manner. Some vaporization of phosphorus values from the mud may still occur and pass out of the still in vapor form. The burning-off of the residual phosphorus in the presence of air is a much faster reaction than vaporization under a nitrogen atmosphere as practised in the prior art and the processing time thereby is significantly decreased, albeit at the expense of a small amount of unrecovered phosphorus.

The burning of the residual phosphorus is exothermic and further serves to raise the temperature of the residue, flush the still and rapidly render the residue sufficiently free of phosphorus to be safe for handling and disposal, either as landfill or reintroduction to the process.

By decreasing the overall batch time using the process of the invention, the volume of mud which can be processed on a long term basis correspondingly increases. The composition of the mud produced by a phosphorus plant varies from time to time and so the improvement in volume throughput correspondingly varies. The actual degree to which the overall batch time can be decreased depends on the quantity of phosphorus required to be removed in the tail period and the proportion of the tail period for which the air feed is used.

The actual time required to process the mud to its final disposable form depends on the phosphorus content of the mud being processed, so that comparisons based on processing time may be misleading. When reference is made herein to decreasing the processing time, such reference assumes a comparison of processing times for mud of the same characteristics.

A more accurate comparison and a more accurate indication of the improvement which is achieved by the present invention is provided by the residue recovery rate, which determines how much solid disposable residue is produced in a unit of time. The method of the present invention enables an increased residue recovery rate to be achieved when compared with the conventional mud processing procedure, irrespective of the constitution of the batch of mud being processed.

BRIEF DESCRIPTION OF DRAWING

FIG. 1 is a schematic flow sheet of a phosphorus plant incorporating the present invention.

GENERAL DESCRIPTION OF INVENTION

The process of the invention generally is concerned with the removal of phosphorus from phosphorus-bearing waste materials, particularly those which are produced in an electrothermal phosphorus plant, including phosphorus mud. The waste materials treated in accordance with the invention generally comprise water, solids and phosphorus in variable proportions, depending on the source of the waste material within the plant. Usually, the phosphorus content of such waste materials varies from about 5 to about 75 wt. % of phosphorus and that of phosphorus mud from about 25 to about 60 wt. % of phosphorus.

The phosphorus-containing waste materials are processed to remove their water and phosphorus contents and leave a solid residue which can be safely disposed of, for example, as landfill. The water and phosphorus are removed from the waste material by evaporation and vaporization. The phosphorus is valuable and hence generally is recovered. In the present invention, some of the phosphorus content of the waste material is sacrificed but for the benefit of the significantly-improved solid residue recovery rate.

The removal of the water and phosphorus is effected by heating the waste material first to the boiling point of water to remove the water and then heating further to the boiling point of yellow phosphorus. The heating operation usually is carried out under an inert atmosphere, typically nitrogen, to prevent oxidation and burning of phosphorus values. Usually, the phosphorus-containing waste material is confined in a vessel and the inert atmosphere is flowed through the vessel to remove the vaporized phosphorus values, which are then condensed from the gas stream externally of the heating vessel.

The heating vessel may take any convenient form which permits the waste material to be processed. Preferably, the heating vessel takes the form described in the aforementioned U.S. Pat. No. 4,081,333 for the advantages described therein. Usually, the waste material is confined in a convenient container for processing in the heating vessel, usually as a relatively shallow high surface area mass to permit ready removal of water vapor and phosphorus.

Once the yellow phosphorus has been boiled off from the waste material, there still remains phosphorus in the solid residue, in the form of red amorphous phosphorus, which is thought to be present as a result of thermal conversion of a portion of the yellow phosphorus during the yellow phosphorus boil off period. Although only a relatively minor proportion of the initial phosphorus content of the waste material, the residual red phosphorus takes a disproportionately long time to remove by vaporization. The residue must be heated to a much higher temperature above the sublimation temperature of red phosphorus in order to remove these residual phosphorus values by vaporization.

In accordance with the present invention, the residual phosphorus is burned off on heating the residue from the yellow phosphorus boil in the presence of an oxygen-containing gas, usually by providing a flow of air through the heating vessel.

The burn-off of phosphorus from the phosphorus-containing waste material in accordance with this invention is effected usually only during the tail phase of the processing procedure, since phosphorus is readily and rapidly removed by evaporation during the yellow phosphorus boil-off phase and also elemental phosphorus is desirably recovered.

The burn-off of phosphorus usually is effected for the whole of the tail phase and, for this purpose, the flow of air to the heating vessel is commenced following the termination of the yellow phosphorus boil phase. At this stage of processing of the phosphorus-containing waste material, the residue temperature is usually approximately 450° C. and the rate of rise of residue temperature has begun to fall off.

It is conceivable, however, and within the scope of this invention, to effect burn-off of the residual phosphorus for a portion only of the tail period with the remainder being removed by sublimation and/or evaporation, since the benefit of increased solids recovery rate is achieved for whatever proportion of the tail period phosphorus burning is effected. From a practical standpoint, it is usual to provide the air flow for at least a substantial proportion of the tail phase.

The air, or other molecular oxygen-containing gas, used for the phosphorus burn-off preferably should be dry to prevent the formation of phosphoric acid in the heating vessel, which can cause corrosion and other problems in the heating vessel.

The flow of air to the heating vessel is continued usually until all the available phosphorus has been removed from the waste material. The end point may be determined from characteristics of the gas stream emanating from the heating vessel and is indicated by a decrease in temperature, an absence of fume or further combustible material and an increase in oxygen content of the condenser off-gas.

The burning of the residual phosphorus is an exothermic process and produces phosphorus oxides, mainly $P_2O_5$. The exotherm assists in heating the residue and hence speeds up the removal of phosphorus. The air flow rate to the heating vessel may be regulated to control the internal temperature of the heating vessel. Much of the $P_2O_5$ contained in the gas stream leaving the heating vessel is removed in the phosphorus condenser. Insoluble gas, such as phosphine, hydrogen and $H_2S$, may be incinerated and the combustion products removed in any convenient manner, such as by scrubbing with an aqueous medium. Condenser water usually is treated to neutralize phosphoric acid values, preferably by contact of the off-gas stream in the condenser by aqueous sodium hydroxide solution.

When the tail phase is completed, indicated by an increased oxygen content in the off-gas stream and a rapid decrease in temperature of the off-gas stream, the solids residue is removed from the heating vessel and is safe for disposal in any convenient manner.

The use of a burn-off procedure in the tail period of the processing of phosphorus-containing waste material decreases this period significantly at the minor cost of the phosphorus consumed and of the neutralizing alkali, thereby enabling the solids residue production rate to be significantly increased.

DESCRIPTION OF PREFERRED EMBODIMENT

Referring to FIG. 1 of the drawings, a yellow phosphorus plant 10 includes a phosphorus furnace 12 wherein phosphate rock, carbon and silica are heated electrothermally to form phosphorus vapor, which is removed from the furnace 12 in association with by-product carbon monoxide and entrained solids by line 14. The furnace product stream may be passed through an electrostatic precipitator 16 to remove some of the entrained solids therefrom, before passing by line 18 to phosphorus condensers 20.

In the phosphorus condensers 20, the phosphorus vapor is cooled and condensed by contact with water fed by line 22, which may include recycled phossy water, usually in a multiple of contact towers. The phosphorus-free carbon monoxide usually is flared to atmosphere by line 24. The condensation operation generally involves recycle of process water by line 26 to contact further gaseous product. The liquid phase resulting from the condensation contains the condensed phosphorus, water and the entrained solids present in line 18 and is forwarded by line 28 to a settling tank 30 or mud settling tank system.

In the settling tank 30, primary separation of yellow phosphorus from the liquid stream 28 occurs and forms a layer of substantially pure phosphorus on the bottom of the tank. The yellow phosphorus is pumped from the storage tank 30 by line 32 to a phosphorus storage and shipping tank 34, from where the yellow phosphorus is sent for shipping by line 36.

Above the yellow phosphorus layer in the settling tank 30 is formed a layer of phosphorus mud and overlying that a layer of phossy water. The mud layer may be pumped by line 38 to a mud storage tank 40 or mud storage tank system, while the phossy water is discharged by line 42 into a closed-loop phossy water discharged by line 42 into a closed-loop phossy water system, the details of which have been omitted from the flow sheet of FIG. 1 in the interests of clarity. Phossy water for disposal is treated with flocculent to cause settling of phosphorus and solids from the phossy water in the form of phosphorus sludge. The phosphorus sludge usually is disposed of by way of the mud still, in admixture with the mud, as described below.

The phosphorus mud from the mud storage tank 40 is forwarded in batches by line 44 to a mud still 46 for high temperature distillation of phosphorus and moisture therefrom. The mud still may be constructed as described in the aforementioned U.S. Pat. No. 4,081,333.

The phosphorus mud first is placed into a skip for processing in the still 46. In the mud still 46, the phosphorus mud first is heated above the boiling point of water to boil off the moisture present in the mud and then is raised above the boiling point of yellow phosphorus to boil off yellow phosphorus. During the moisture and yellow phosphorus removal stages, a purge stream of nitrogen is fed by line 48 to the still 46 to remove the vapors, which flow out of the still by line 50 to phosphorus condensers 52. Phosphorus removed from the still off-gas stream in the condenser 52 is passed from the condenser sump 54 to the phosphorus shipping tank 34 by line 56. The phosphorus-free off-gas is vented from the condenser 52 by line 53.

The flow rate of nitrogen to the mud still 46 by line 48 depends on a number of factors including the size of the still and the volume of gaseous material boiled from the phosphorus mud. Generally, the nitrogen flow rate varies from about 5 to about 100 scfm. The temperature of the nitrogen gas stream fed to the mud still by line 46 is not critical and is usually about ambient temperature.

When the yellow phosphorus boil-off is complete, the mud processing enters the tail phase, during which, in accordance with this invention, the residual phosphorus is burned off. Prior to commencement of the feed of dry air to the mud still 46 by line 58 to effect the burning, the flow rate of nitrogen may be increased to a higher level for a short period to ensure that any potentially-explosive gases, for example, hydrogen or phosphine, are purged from the mud still 46.

Once this fast purge has been completed, the flow of air to the still is commenced to effect combustion of the residual phosphorus. The flow rate of air to the mud still is regulated to maintain the internal temperature below the practical limits of operation, typically 600° C. The flow rate employed usually is in the range of about 40 to about 130 scfm. The temperature of the dry air stream fed by line 58 to the mud still 46 is not critical and is usually about ambient temperature on entry.

During the burn off of the phosphorus, aqueous sodium hydroxide is fed to the condenser 52 by line 58 along with the sump recycle stream 60 to neutralize the $P_2O_5$ formed in the mud still and passing to the condensers 52 by line 50. Once the residue is phosphorus free, the air feed by line 58 is terminated. Nitrogen feed by line 48 may be recommenced to ensure the removal of any combustible gases which continue to evolve while the skip remains in the still.

The skip then is removed from the mud still 46 and may be replaced by another skip for processing of a further batch of phosphorus mud. The solid residue is substantially phosphorus free and is discharged by line 62.

For the same phosphorus level in the mud, the procedure of the invention wherein the residual phosphorus is burned off decreases the cycle time for the mud batch in the mud still 46. However, as noted above, the phosphorus content of the mud tends to vary, so a direct comparison of cycle times often is misleading. The procedure nevertheless significantly increases the solids recovery rate from the mud still 46 which, in turn, leads to an ability to process increased quantities of mud through the still 46.

By using air to burn off the residual phosphorus in the residue, in accordance with the present invention, the significant advantage of increased residue recovery rate is achieved at the minor expense of a small loss of phosphorus recovery.

EXAMPLES

EXAMPLE 1

A mud processing still of the type described in U.S. Pat. No. 4,081,333 was operated to process phosphorus mud from a commercial phosphorus plant in a process which used an air bleed following completion of the yellow phosphorus boil phase.

A charge of 1327 kg of mud was added to a skip which contained a blanket of 350 kg of process water. The mud formed a layer over the skip bottom 100 mm thick. The mud had a composition of 61% water, 30% phosphorus and 9% solids.

The cold mud and supernatant water were placed in a hot still. The still was sealed such that the off-gas would pass through the phosphorus vapor condenser to atmosphere. A flow of 5 scfm of nitrogen was established through the still, of which 4 scfm were directed through the annulus between the skip and the still walls above the heat transfer medium and 1 scfm passed through a vertical sparger centrally located in the skip and slightly above the layer of mud.

The still was heated and during the first 1.5 hours of processing water distilled from the mud as indicated by a plateau in the temperature trace indicated by a skip content thermocouple suspended above the mud. During that time the temperature of the base of the still rose towards a target temperature of 580° C., the lid towards 460° C. and the side towards 300° C. The still off-gas temperature remained steady.

The phosphorus distillation followed, from a residue depleted of water. The phase was characterized by a skip contents temperature which rose continuously, except for a point of inflexion after 3 hours of processing and a peak in the still off-gas temperature at the same time. Thereafter, the still temperatures rose to their target values and the skip contents temperature attained 480° C. after 4.8 hours of processing. The extent of the rapid phase of the yellow phosphorus distillation was deduced from the trace of the off-gas thermocouple which peaked after 1.9 hours, decreased and then remained steady after 3.3 hours.

The skip contents temperature became steady at 480° C. at which time the nitrogen flow to the control sparger was replaced by a low flow rate of dry air (dewpoint $-40°$ C.).

The air flow rate was gradually increased to approximately 40 scfm between 4.8 and 7.3 hours of processing. Half an hour after the start of the air-bleed, the still heating power was turned off.

The following were noted during the air bleed:

1. The skip contents temperature rose as the airflow was increased and reached a maximum of 640° C. 0.8 hours after adding air. Thereafter, the temperature decreased in spite of the increasing air flow rate.

2. The still off-gas temperature rose steadily for 2 hours after adding air, thereafter decreasing.

3. Apart from that of the base, the still temperature was maintained.

4. The condenser off-gas gradually lost its typical green phosphorescence and was replaced by a flow of white phosphoric acid mist in nitrogen. After 7.3 hours of processing the off-gas contained 4% of oxygen.

5. The still off-gas was gradually depleted in both elemental phosphorus (initially) and phosphorus pentoxide (later stage) content and finally became colorless 2.4 hours after starting the air bleed.

The end-point of the batch was indicated by the decreasing still off-gas temperature and confirmed by the presence of oxygen in the condenser off-gas and the absence of fume in the still off-gas. The air and nitrogen were turned off and the skip removed from the still after 7.4 hours of processing.

The skip contained 120 kg of phosphorus-free residue in a layer about 60 mm deep. Some phosphorus pentoxide adhered to the surface of the residue and the skip. The typical smell of sulphur dioxide, from the sulphur content of the coke in the residue, was absent.

The residue recovery rate for this phosphorus mud batch was 16.2 kg/still hour. The phosphorus lost in the form of $P_2O_5$ was less than 7% of that charged.

EXAMPLE 2

A mud processing still of the type described in U.S. Pat. No. 4,081,333 again was operated to process phosphorus mud from a commercial phosphorus plant in a process which used an air bleed following completion of the yellow phosphorus boil stage.

This Example differs from Example 1 in that the base of the still was heated throughout the air-bleed and in that the air flow rate was raised to approximately 100 scfm.

A charge of 1782 kg of mud was added to a skip which contained a blanket of 350 kg of water. The mud formed a layer over the skip bottom 150 mm thick. The mud had a composition of 52% water, 37% phosphorus and 11% solids.

The skip of cold mud was placed in a hot still and the nitrogen flow and heating established as described in Example 1.

Water distilled from the mud for 2.7 hours, in which time the still base remained at 550° C., the lid was substantially at 460° C. while the side temperature fell gradually to 350° C. The still off-gas temperature rose only slightly.

The point of inflexion in the skip contents temperature trace occurred after 3.3 hours of processing, representing the effect of the phosphorus boil. At that time the still off-take temperature started to decrease; indicating decreasing quantities of phosphorus vapor passing to the condenser.

After 4.8 hours of processing the skip contents temperature had reached 460° C. and was starting to plateau. The still side temperature was 460° C. The nitrogen in the central sparger was replaced by dry air and its flow rate increased to about 100 scfm in a very short time. Within 0.75 hours the skip contents temperature reached a maximum which exceeded 800° C. The off-gas temperature maximum was 515° C. after 6.5 hours of processing, the lid maximum was 572° C. after 6.75 hours and the still side 552° C. after 6.7 hours.

The condenser off-gas contained 1% of oxygen after 6.7 hours, 13% after 7.25 hours and 14% after 7.5 hours. The still off-gas became colorless after 7.7 hours of processing. The air and nitrogen were turned off after 7.8 hours of processing and the skip removed from the still.

The skip contained 158 kg of phosphorus-free residues covered by a thin white layer of phosphorus pentoxide. The residue recovery rate was 20.3 kg/still hour.

EXAMPLE 3

A mud processing still of the type described in U.S. Pat. No. 4,081,333 was operated to process phosphorus mud from a commercial phosphorus plant, in a process which used a conventional processing effected under nitrogen.

A charge of 1477 kg of mud was added to a skip which contained a blanket of 350 kg of process water. The mud formed a layer over the bottom of the skip 130 mm deep. The mud had a composition of 33% water, 56% phosphorus and 12% solids.

The skip of cold mud was placed in a hot still and the nitrogen flow and heating established as described in Example 1.

Water distilled from the mud for 1.4 hours, in which time the still base remained at 555° C., the lid was generally at 450° C. while the side temperature fell to 350° C. The still off-gas temperature rose only 10° C.

The phosphorus boil was well defined by a point of inflexion in the skip contents temperature trace after 2.1 hours of processing. The still off-gas temperature was relatively insensitive to the phosphorus evolution, rising from 310° C. to 340° C. and thereafter falling to 335° C. after 5.4 hours of processing where it remained until the batch was finished after 23.5 hours. The skip contents reached a steady temperature of 505° C. after 5.4 hours processing, by which time the still temperatures were steady, remaining so until the end of the batch.

The end-point was indicated by the absence of large quantities of fume in the still off-gas. The still was cleared of residual fume by sparging nitrogen at approximately 100 scfm into the centre of the still for 10 minutes. The nitrogen was turned off after 23.5 hours of processing and the skip removed from the still.

The skip contained 182 kg of phosphorus-free residues. The residue recovery rate was 7.7 kg/still hour.

EXAMPLE 4

A mud processing still of the type described in U.S. Pat. No. 4,081,333 again was operated to process phosphorus mud from a commercial phosphorus plant to a substantially phosphorus-free solid residue. For some batches, conventional processing was effected under nitrogen while, for some other batches, an air bleed was employed following completion of the yellow phosphorus boil phase.

Those batches which received air were processed essentially as described in Example 2. That is, the mud was heated under nitrogen until the skip contents temperature reached approximately 480° C. or indicated that it was beginning to stabilize; at that point dry air was added at a rate, generally not exceeding 125 scfm, which was limited only by the need to maintain the steel still structure at a safe temperature. The airflow was maintained until the still off-gas became colorless, when the batch was removed from the still.

Those batches which were processed according to the conventional method were treated and behaved as described in Example 3. That is, the water and the majority of the phosphorus distilled in a relatively small fraction of the total batch time, and the batches were characterized by a long tail period where residual red amorphous phosphorus slowly sublimed and was transferred to the condenser.

The results of these batches are set forth in the following Table I:

TABLE I

|  | Without Air | With Air Bleed |
|---|---|---|
| Number of Batches | 588 | 230 |

TABLE I-continued

|  | Without Air | With Air Bleed |
|---|---|---|
| Total Mud weight (kg) | 1,023,280 | 401,774 |
| Gross Processing Rate (kg/hr) | 126.4 | 164.4 |
| P4 in Mud (%) | 42.5 | 45.6 |
| Solids (residue) in Mud (%) | 7.2 | 10.4 |
| Water in Mud (%) | 50.3 | 44.0 |
| Mud per batch (kg) | 1740 | 1747 |
| Residue per batch (kg) | 125 | 182 |
| Batch Time (hr) | 15.9 | 12.4 |
| Residue Recovery Rate (kg/hr) | 7.9 | 14.8 |

As may be seen from these results, the recovery rate of residue is substantially increased by the use of the air bleed.

SUMMARY OF DISCLOSURE

In summary of this disclosure, improved processing of phosphorus mud and other phosphorus-containing waste material to disposable solids is effected by combusting residual amounts of phosphorus. Modifications are possible within the scope of the invention.

What we claim is:

1. In a method of processing an aqueous phosphorus-containing solids-containing waste material containing about 5 to about 75 wt. % of elemental phosphorus and which is phosphorus mud obtained as a by-product in the electrothermal production of elemental phosphorus by removing the water and phosphorus substantially completely therefrom, the improvement in said processing which consists essentially of the steps of:
   first boiling off said water from said waste material to effect said substantially-complete removal of water therefrom,
   next boiling-off yellow phosphorus from said waste material, and
   finally burning off residual phosphorus remaining from said boiling-off of yellow phosphorus from said waste material,
   whereby said boiling-off of yellow phosphorus and said burning-off of said residual phosphorus effects substantially complete removal of phosphorus from said waste material to produce a substantially phosphorus-free solid residue.

2. The method of claim 1 wherein said boiling off of said water and yellow phosphorus is effected in a closed vessel through which an inert gas stream flows to remove said boiled off materials and said burning of phosphorus is effected while flowing a molecular oxygen-containing gas stream through said vessel.

3. In the method of processing an aqueous phosphorus-containing solids containing waste material containing from about 5 to about 75 wt. % of elemental phosphorus by removing the water and phosphorus substantially completely therefrom, the improvement which consists essentially of the sequential steps of:
   (a) initially boiling off water from said waste material to effect substantially complete removal of water therefrom,
   (b) subsequently boiling-off yellow phosphorus from said waste material to result in a solid residue containing recoverable element phosphorus valves, wherein said boiling-off of said water and of said yellow phosphorus is effected in a closed vessel through which an inert gas stream flows to remove the boiled-off materials, and (c) subsequently burning off substantially all of said recoverable elemental phosphorus values from said solid residue in a molecular oxygen-containing gas stream flowing through said vessel until substantially all of said recoverable elemental phosphorus values has been removed from the residue to produce a substantially phosphorus-free solid residue.

4. The method of claim 3 wherein said oxygen-containing gas stream is dry air.

5. The method of claim 3 wherein said phosphorus-containing waste material contains about 25 to about 60 wt. % of phosphorus.

6. The method of claim 3 wherein said burning of phosphorus produces an off-gas stream containing phosphorus oxides, and said off-gas stream is contacted with an alkaline aqueous medium to remove said phosphorus oxides therein and to neutralize the phosphorus acids so produced.

7. In a cyclic method for the processing of aqueous phosphorus-containing solids-containing waste material wherein successive batches of said waste material are confined in a first closed vessel in such a manner as to provide a large surface area, and each such batch is serially subjected to the operation of positioning the first vessel in a further closed vessel for heating by contact between said first closed vessel and a heat exchange medium in said further closed vessel, heating the waste material in the first closed vessel to an elevated temperature while flowing a gas stream through both said first closed vessel and said further closed vessel, so as to effect successively (1) boil-off of water from the waste material, (2) boil-off of yellow phosphorus and (3) removal of residual phosphorus and form a substantially phosphorus-free residue, and removing the first vessel from the further vessel, the improvement consists essentially of (a), during said boil-off of water and said boil-off of yellow phosphorus, the gas stream is an inert gas stream, the inert gas stream is removed from the first and further vessels and the vaporized materials are recovered therefrom, and (b), during at least a substantial proportion of said removal of residual phosphorus, said gas stream comprises a molecular oxygen-containing gas stream, said removal of residual phosphorus is effected by burning of the residual phosphorus to phosphorus oxides and volatilization of residual phosphorus, the oxygen-containing gas stream is removed from the first and further vessels and the reaction products are recovered therefrom.

* * * * *